United States Patent
Frolovichev

(10) Patent No.: US 12,015,615 B2
(45) Date of Patent: *Jun. 18, 2024

(54) APPARATUS AND METHOD FOR COORDINATING THE MATCHING AND INITIAL COMMUNICATIONS BETWEEN INDIVIDUALS IN A DATING APPLICATION

(71) Applicant: AMI Holdings Limited, Hamilton (BM)

(72) Inventor: Sergey Frolovichev, Hamilton (BM)

(73) Assignee: Bumble IP Holdco LLC, Wilmington, DE (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/850,405

(22) Filed: Jun. 27, 2022

(65) Prior Publication Data
US 2023/0018386 A1    Jan. 19, 2023

Related U.S. Application Data

(63) Continuation of application No. 17/073,994, filed on Oct. 19, 2020, now Pat. No. 11,373,441, which is a
(Continued)

(51) Int. Cl.
*G06V 40/12* (2022.01)
*G06V 10/75* (2022.01)
(Continued)

(52) U.S. Cl.
CPC ............ *H04L 63/102* (2013.01); *G06V 10/75* (2022.01); *G06V 40/1365* (2022.01);
(Continued)

(58) Field of Classification Search
CPC ... H04L 63/102; H04L 63/0861; G06V 10/75; G06V 40/1365; G06V 40/172; G06Q 50/01
See application file for complete search history.

(56) References Cited

U.S. PATENT DOCUMENTS

| 5,815,595 A | 9/1998 | Gugler |
| 7,203,674 B2 | 4/2007 | Cohen |
| (Continued) | | |

FOREIGN PATENT DOCUMENTS

| CN | 104854611 | 8/2015 |
| CN | 103092899 | 12/2016 |
| (Continued) | | |

OTHER PUBLICATIONS

PCT International Preliminary Report on Patentability in International Appln. No. PCT/IB2019/059318, dated May 14, 2021, 10 pages.

(Continued)

*Primary Examiner* — Gregory M Desire
(74) *Attorney, Agent, or Firm* — Fish & Richardson P.C.

(57) ABSTRACT

A computer implemented method includes supplying to a client device prompts for a first individual to specify matching criteria for a potential introduction to a second individual. The matching criteria includes a filter to sort a pool of individuals by a facial feature categorized by a facial recognition module. Matching criteria from the client device are collected. Matches between the first individual and a pool of individuals are generated based upon the matching criteria. The matches are supplied to the client device. A match acceptance by the first individual of the second individual is collected. Attributes of the second individual are verified to selectively establish a verified status. Network communication between the first individual and the second individual are enabled in response to the verified status.

20 Claims, 3 Drawing Sheets

Related U.S. Application Data continuation of application No. 16/175,372, filed on Oct. 30, 2018, now Pat. No. 10,810,403.

(51) Int. Cl.
  *G06V 40/16* (2022.01)
  *H04L 9/40* (2022.01)
  *G06Q 50/00* (2012.01)

(52) U.S. Cl.
  CPC ........ *G06V 40/172* (2022.01); *H04L 63/0861* (2013.01); *G06Q 50/01* (2013.01)

(56) References Cited

U.S. PATENT DOCUMENTS

| | | | |
|---|---|---|---|
| 7,684,651 | B2 | 3/2010 | Tang |
| 7,760,917 | B2 | 7/2010 | Vanhoucke |
| 8,484,186 | B1 | 7/2013 | Kapczynski et al. |
| 8,566,327 | B2 | 10/2013 | Carrico |
| 8,595,257 | B1 | 11/2013 | Ovide |
| 9,208,177 | B2 | 12/2015 | Petrou et al. |
| D755,814 | S | 5/2016 | Rad et al. |
| 9,342,855 | B1 | 5/2016 | Raphael |
| 9,405,967 | B2 * | 8/2016 | Samet ..................... G06F 21/44 |
| 9,443,070 | B2 * | 9/2016 | Torgersrud ............. H04L 63/30 |
| 9,537,706 | B2 * | 1/2017 | Frind ..................... H04L 51/52 |
| 9,560,156 | B1 | 1/2017 | Rana |
| D779,540 | S | 2/2017 | Rad et al. |
| D781,311 | S | 3/2017 | Rad et al. |
| D781,334 | S | 3/2017 | Rad et al. |
| 9,672,289 | B1 * | 6/2017 | Frind ................. G06F 16/9535 |
| D791,809 | S | 7/2017 | Rad et al. |
| 9,715,532 | B1 | 7/2017 | Hall et al. |
| 9,721,253 | B2 * | 8/2017 | Gideoni ................. G06Q 30/06 |
| 9,733,811 | B2 | 8/2017 | Rad et al. |
| D798,314 | S | 9/2017 | Rad et al. |
| 9,753,948 | B2 | 9/2017 | Farrell |
| 9,848,082 | B1 | 12/2017 | Lillard et al. |
| 9,959,023 | B2 | 5/2018 | Rad et al. |
| 10,021,344 | B2 | 7/2018 | Farrell et al. |
| 10,318,109 | B2 | 6/2019 | Desjardins |
| 10,654,942 | B2 | 5/2020 | Resnick et al. |
| 10,810,403 | B2 | 10/2020 | Frolovichev |
| 11,012,387 | B2 | 5/2021 | Kneeland et al. |
| 11,050,688 | B2 | 6/2021 | Frolovichev |
| 11,373,441 | B2 | 6/2022 | Frolovichev |
| 2006/0229896 | A1 | 10/2006 | Rosen et al. |
| 2008/0040227 | A1 | 2/2008 | Ostermann et al. |
| 2008/0086431 | A1 | 4/2008 | Robinson et al. |
| 2010/0088111 | A1 | 4/2010 | Bailey |
| 2011/0055334 | A1 | 3/2011 | Tivyan |
| 2011/0191147 | A1 | 8/2011 | Cunningham |
| 2012/0066118 | A1 | 3/2012 | Dantas |
| 2012/0136689 | A1 | 5/2012 | Ickman |
| 2012/0271380 | A1 | 10/2012 | Roberts |
| 2012/0290977 | A1 | 11/2012 | Devecka |
| 2012/0296895 | A1 | 11/2012 | Robinson et al. |
| 2013/0102299 | A1 | 4/2013 | Liu |
| 2013/0165234 | A1 | 6/2013 | Hll |
| 2013/0179925 | A1 | 7/2013 | Woods |
| 2013/0282745 | A1 | 10/2013 | Mishra |
| 2013/0282841 | A1 | 10/2013 | Bates et al. |
| 2013/0318162 | A1 | 11/2013 | Wright |
| 2013/0346564 | A1 | 12/2013 | Warrick |
| 2014/0019173 | A1 | 1/2014 | Spindler |
| 2014/0032434 | A1 | 1/2014 | Kumar |
| 2014/0074824 | A1 | 3/2014 | Rad et al. |
| 2014/0115658 | A1 | 4/2014 | Ayodele |
| 2014/0195549 | A1 | 7/2014 | Ahn |
| 2014/0258260 | A1 | 9/2014 | Rayborn |
| 2014/0303981 | A1 | 10/2014 | Skiba et al. |
| 2014/0328536 | A1 | 11/2014 | Whitehill |
| 2014/0344031 | A1 | 11/2014 | Clinton et al. |
| 2014/0344061 | A1 | 11/2014 | Choi et al. |
| 2014/0357247 | A1 | 12/2014 | Assuncao |
| 2015/0046357 | A1 | 2/2015 | Danson |
| 2015/0058059 | A1 | 2/2015 | Kahan |
| 2015/0089660 | A1 | 3/2015 | Song et al. |
| 2015/0161632 | A1 | 6/2015 | Humay |
| 2015/0172243 | A1 | 6/2015 | Parikh et al. |
| 2015/0206100 | A1 | 7/2015 | Zamel et al. |
| 2015/0207765 | A1 | 7/2015 | Brantingham et al. |
| 2015/0254618 | A1 | 9/2015 | Shivaram |
| 2015/0310507 | A1 | 10/2015 | Woodward |
| 2016/0021199 | A1 | 1/2016 | Krimon et al. |
| 2016/0105388 | A1 | 4/2016 | Bin Mahfooz et al. |
| 2016/0132608 | A1 | 5/2016 | Rathod |
| 2016/0140672 | A1 | 5/2016 | Shnitzer et al. |
| 2016/0154569 | A1 | 6/2016 | Rad et al. |
| 2016/0316503 | A1 | 10/2016 | Lo |
| 2016/0344777 | A1 | 11/2016 | Fahlgren |
| 2017/0337521 | A1 | 11/2017 | Godbole |
| 2017/0358033 | A1 | 12/2017 | Montoya |
| 2018/0150205 | A1 | 5/2018 | Rad et al. |
| 2018/0189072 | A1 | 7/2018 | Mobeen |
| 2018/0285986 | A1 | 10/2018 | Perry |
| 2018/0292981 | A1 | 10/2018 | Rad et al. |
| 2019/0050920 | A1 | 2/2019 | Kumar |
| 2019/0080012 | A1 | 3/2019 | Huang |
| 2019/0158305 | A1 | 5/2019 | Cui |
| 2019/0164108 | A1 | 5/2019 | Chimka |
| 2020/0125700 | A1 | 4/2020 | Chang et al. |
| 2020/0134288 | A1 | 4/2020 | Frolovichev |
| 2020/0134739 | A1 | 4/2020 | Frolovichev |
| 2020/0137003 | A1 | 4/2020 | Frolovichev |
| 2020/0137007 | A1 | 4/2020 | Kneeland et al. |
| 2021/0103715 | A1 | 4/2021 | Frolovichev |
| 2021/0249912 | A1 | 8/2021 | Glover |
| 2021/0400001 | A1 | 12/2021 | Frolovichev |
| 2022/0014487 | A1 | 1/2022 | Kneeland et al. |

FOREIGN PATENT DOCUMENTS

| | | |
|---|---|---|
| CN | 104170316 | 1/2018 |
| CN | 107526610 | 7/2021 |
| WO | WO 2016/076976 | 5/2016 |
| WO | WO 2017/054081 | 4/2017 |

OTHER PUBLICATIONS

PCT International Search Report and Written Opinion in International Appln. No. PCT/IB2019/059318, dated Feb. 4, 2020, 13 pages.

PCT Invitation to Pay Additional Fees in International Appln. No. PCT/IB2019/059318, dated Dec. 11, 2019, 14 pages.

\* cited by examiner

APPARATUS AND METHOD FOR COORDINATING THE MATCHING AND INITIAL COMMUNICATIONS BETWEEN INDIVIDUALS IN A DATING APPLICATION

CROSS-REFERENCE TO RELATED APPLICATIONS

This application is a continuation application of and claims priority to U.S. application Ser. No. 17/073,994, filed on Oct. 19, 2020, now U.S. Pat. No. 11,373,441, which is a continuation application of U.S. application Ser. No. 16/175,372, filed on Oct. 30, 2018, now U.S. Pat. No. 10,810,403.

FIELD OF THE INVENTION

This invention relates generally to social media dating applications deployed in computer networks. More particularly, this invention is directed toward techniques for coordinating the matching and initial communications between individuals in a dating application.

BACKGROUND OF THE INVENTION

Many individuals avoid social media dating applications if they are required to sort through large numbers of images of individuals. Thus, there is a need to only supply images that are consistent with a users designated image attribute preferences. Similarly, many individuals dislike the receipt of large numbers of messages. Thus, there is a need to appropriately prioritize received messages in a dating application.

SUMMARY OF THE INVENTION

A computer implemented method includes supplying to a client device prompts for a first individual to specify matching criteria for a potential introduction to a second individual. The matching criteria includes a filter to sort a pool of individuals by a facial feature categorized by a facial recognition module. Matching criteria from the client device are collected. Matches between the first individual and a pool of individuals are generated based upon the matching criteria. The matches are supplied to the client device. A match acceptance by the first individual of the second individual is collected. Attributes of the second individual are verified to selectively establish a verified status. Network communication between the first individual and the second individual are enabled in response to the verified status.

BRIEF DESCRIPTION OF THE FIGURES

The invention is more fully appreciated in connection with the following, detailed description taken in conjunction with the accompanying drawings, in which.

Like reference numerals refer to corresponding parts throughout the several views of the drawings.

DETAILED DESCRIPTION OF THE INVENTION

Figure 1:
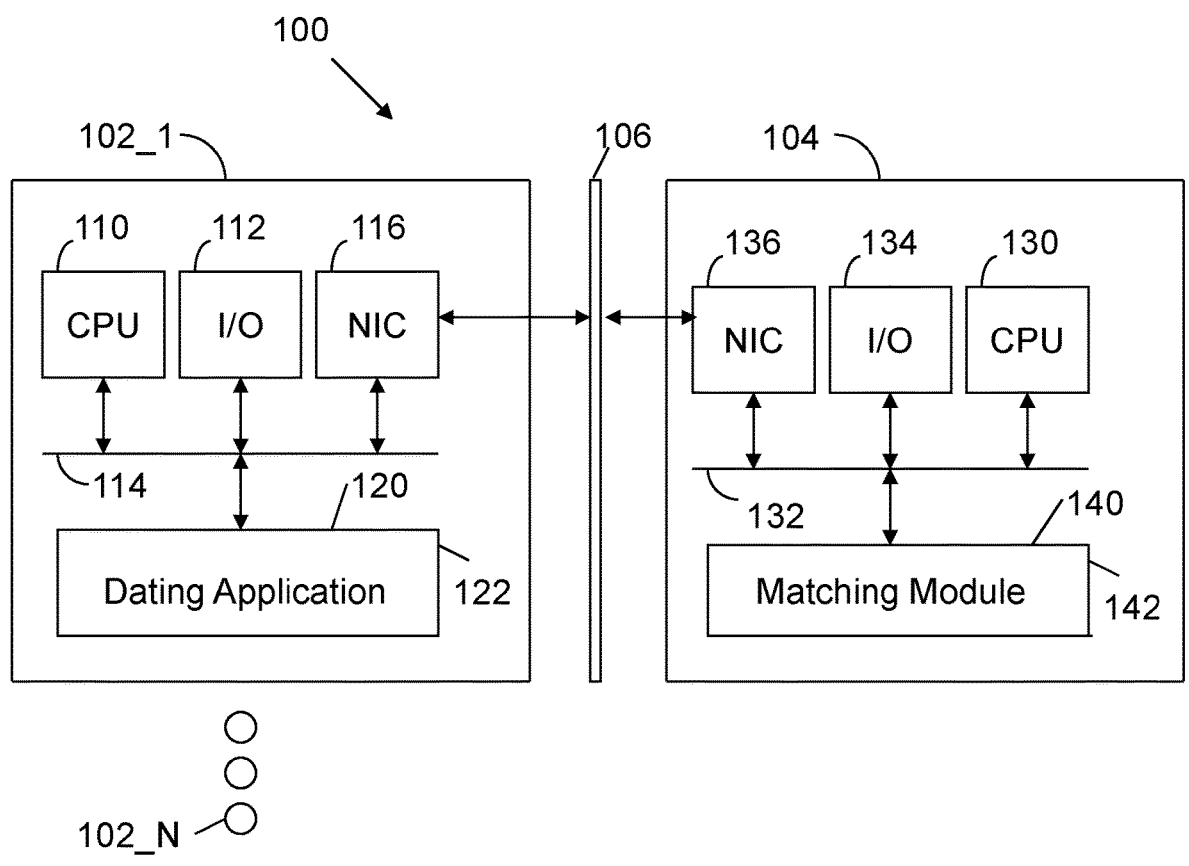
FIG. 1 illustrates a system configured in accordance with an embodiment of the invention.

FIG. 1 illustrates a system 100 configured in accordance with an embodiment of the invention. The system 100 includes a set of client devices 102_1 through 102_N communication with a server 104 via a network 106, which may be any combination of wired and wireless networks. Each client device 102 includes a processor (e.g., central processing unit) 110 in communication with input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by the processor 110. In particular, the memory 12.0 stores a dating application 122, which communicates with server 104 to coordinate introductions between individuals that have been identified as potential matches. Typically, each client device 102_1 through 102_N is a mobile device executing the dating application 122. Different client devices 102_1 through 102_N are operated by different individuals that subscribe to the same dating application 122.

Server 104 includes standard components, such as a processor 130, bus 132, input/output devices 134 and a network interface circuit 136 to provide connectivity to network 106. A memory 140 is connected to the bus 132. The memory 140 stores a matching module 142 with instructions executed by the processor 130 to implement operations disclosed in connection with FIG. 2.

Figure 2:
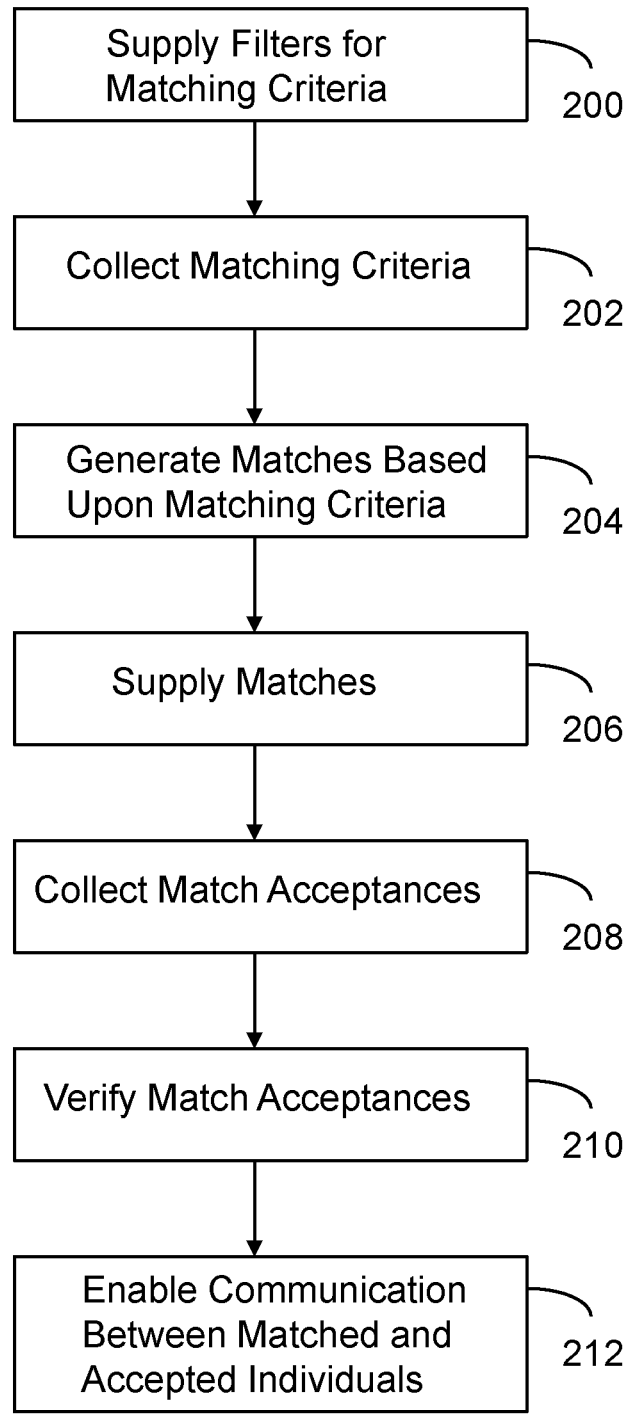
FIG. 2 illustrates processing.; operations performed in accordance with an embodiment of the invention.

Turning to FIG. 2, the matching module 142 initially supplies filters for matching criteria 200. That is, the matching module 142 supplies to a client device operated by a first individual a user interface with prompts that are used to collect matching criteria for a potential introduction to a second individual. The matching criteria includes a filter to sort a pool of individuals)y a facial feature categorized by a facial recognition module. The matching module 142 stores images of individuals that subscribe to the data application. The matching module 142 includes a facial recognition module to categorize facial features of individuals that subscribe to the data application. The facial feature category may be one or more of eye color, eye size, hair color, hair colors, hair volume, hair shape, eyeglasses, eye brow prominence, cheek shape and the like.

Figure 3:
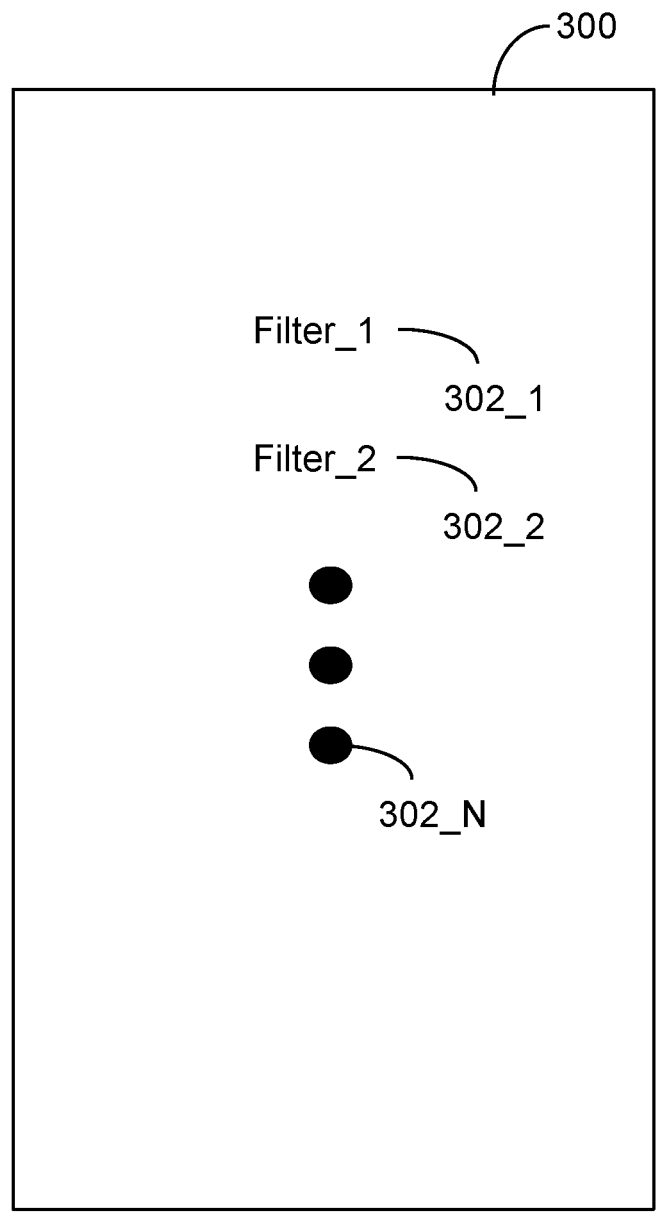
FIG. 3 illustrates a user interface configured in accordance with an embodiment of the invention.

FIG. 3 illustrates a user interface 300 that may he supplied from the matching module 142 to a client device 102 in accordance with an embodiment of the invention. The user interface 300 includes individual prompts 302_1 through 302_N r different filter criteria. The different filter criteria may he any of the facial feature categories identified above. A gesture (e.g., a swiping motion) is applied to the user interface 300 to specify an applicable filter. Filters may also specify a search radius (e.g individuals with 10 miles) and an age range.

Thus, the interface 300 provides a simple social media dating application entry process that collects sufficient information to establish improved matches. The facial feature filters sort images that are consistent with a users designated image attribute preferences, without the user having to do so. Consequently, fewer images are communicated across network 106, less memory is utilized by dating application 122 and fewer processing cycles are consumed by processor 110 of client device 102. More importantly, user satisfaction increases as a user receives better and fewer recommendations.

Returning to FIG. 2, matching criteria is collected 202 from client devices 102_1 through 102_N at the server 104. The matching module 142 then generates matches 204 based upon matching criteria. The matching criteria may be based upon any number of factors and may use any number of techniques including applied rules, collaborative filtering and/or machine learning. However, a critical filter condition is satisfaction of the facial feature attributes preferred by the user.

The matches are then supplied 206 from the matching module 142 at the server 104 to one or more client devices 102. Match acceptances are then collected 208 from client devices 102. For example, a photograph of an individual may be presented and a first gesture (e.g., a swipe down on the screen or a swipe to the left on the screen) may indicate no interest, while a second gesture (e.g., a swipe up on the screen or a swipe to the right on the screen) may indicate interest.

In one embodiment, an additional operation is performed after a match acceptance, namely verification of match acceptances 210. Verification may be in various forms. For example, verification may be verification of a user profile. For example, verification may require a minimum number of profile parameters to be completed (e.g., name, age, intelligible user image, etc.). Verification may be in the form of user information being verified, such as through a social network (e.g., Facebook®) or computer network identity resource (e.g., a server with White Page identity listings). This additional operation results in fewer images being communicated across network 106, less memory utilized by dating application 122 and fewer processing cycles consumed by processor 110 of client device 102. In addition, user satisfaction increases as a user receives better and fewer recommendations.

Network communication is then enabled between matched and accepted individuals 210. For example, network communication in the form of a text message may be enabled between a first individual and a second individual in response to a match between the first individual and the second individual and a match acceptance by at least one of the first individual and the second individual. The criteria to enable communication may be configured in a variety of manners. For example, it may be specified that only one gender may initiate communication. For example, the dating application 122 may be configured with a requirement that a female always initiate communication, in one embodiment, the dating application supplies a designated emoticon (e.g., a smiling face). Selection of the designated emoticon by the female results in the emoticon being sent to the matched individual and overrides the communication restriction that requires the female to communicate first. While the emoticon is a form of communication, it is simpler to send than a formulated textual message. Thus, the female is in a position to allow the matched individual to set the tone of the initial substantive communication.

Enabling communication may be predicated upon a single individual accepting a match. Alternately, enabling communication may be predicated upon a requirement that both a first individual and a second individual accent a match.

In one embodiment, the matching module 142 assigns a priority value to a received. message. Messages may then be presented in a ranked priority order. Alternately, the priority value may be used to sort messages into discrete message priority categories (e.g., high priority, medium priority, low priority, probably unnecessary to review, dispose message, etc.). This ranking mechanism allows a user to focus on the most important messages and possibly ignore others. Thus, a user potentially spends less time on the dating application and the client device 102 consumes fewer cycles of the processor 110.

The priority value may be based on a number of consideration. The matching module 142 predicts a match compatibility value for each proposed match, which may be used to establish a priority value when one individual. of the match contacts the other. The priority value may be based upon the dating application status of the matched individual, dating application behavior of the matched individual, eking with other considerations. In one embodiment, the priority criteria is configurable by a user.

Thus, the matching module 142 facilitates a digital service that can connect individual users through mutual agreement (matching) for purposes including, but not exclusively, socializing, networking, and dating. The dating application 122 may be implemented as an application for a mobile device., a website or a standalone computer application.

A users personal profile can include name, age, city, photographs, biographical text, links to social media profiles on other networks, and a range of other fields that allow users to characterize themselves. Once a profile is complete, a user can begin to view the profiles of other users, while the new profile is circulated among the user base.

A user receives profiles of other users who have met the filtering criteria; the user is able to explore the personal information that has been added to a profile. Profiles are served to the user one-by-one, with the option to look through multiple pictures per profile, expand text, and click through to external information and profiles on other social networks. To ascertain the mutual agreement to connect two users together, every profile viewed must be 'voted' on. Having viewed the personal profile of another user, the viewing user swipes (click and drag the profile using their finger) the served profile off the screen in a certain direction (e.g., right or up) if they would like to connect with that specific user or (e.g., left or down) if they do not.

In one embodiment, once a user has voted yes upon the profile of another user, the matching module 142 places the profile of the first user into the queue of profiles to be viewed by the second user. Through this mechanism the matching module 142 is able to accelerate the pace with which two users may view each-others profiles than would happen in a purely organic system of profile selection.

In one embodiment, the system does not require that both users be online at the same time for a match to be suggested. In one embodiment, when one user votes yes and the other user votes no, no further connection is established between the two users, and their profiles may not be shown to each-other again (or they may be shown again depending on changes within their profile, location, search parameters, or because of time elapsed). When two users both mutually vote 'yes' upon the other users profile, a connection is established between the two accounts which allows for direct communication. In one embodiment, matched users are directed to a direct messaging system supported by server 104. This system can display elements of a users profile in order to increase recognition of the other user (e.g., name, age, photograph).

An embodiment of the present invention relates to a computer storage product with a computer readable storage medium having computer code thereon for performing various computer-implemented operations. The media and computer code, may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICS"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-implemented method, comprising:
   receiving user information and matching criteria associated with a first individual, the matching criteria specifying one or more characteristics of one or more individuals from a pool of individuals;
   verifying the user information associated with the first individual to selectively establish a verified status for the first individual;
   generating a match between the first individual and a second individual from the pool of individuals based at least in part on the matching criteria and the verified status for the first individual; and
   enabling network communication between the first individual and the second individual in response to the match.

2. The computer-implemented method of claim 1, wherein the user information associated with the first individual comprises one or more of name, age, city, an image, biographical text, or a link to a social media profile.

3. The computer-implemented method of claim 1, wherein verifying the user information associated with the first individual comprises determining that a minimum number of parameters for the user information have been completed.

4. The computer-implemented method of claim 1, wherein verifying the user information associated with the first individual comprises verifying one or more parameters of the user information through a social network.

5. The computer-implemented method of claim 1, wherein verifying the user information associated with the first individual comprises verifying one or more parameters of the user information through a computer network identity resource.

6. The computer-implemented method of claim 1, wherein the matching criteria associated with the first individual comprises one or more facial features specified by the first individual.

7. The computer-implemented method of claim 6, wherein generating the match comprises:
   applying a facial recognition module to images of the one or more individuals from the pool of individuals to identify facial features of each of the one or more individuals; and
   filtering the one or more individuals based on the identified facial features and the one or more facial features specified by the first individual.

8. The computer-implemented method of claim 1, comprising:
   assigning a priority value to a message from the first individual to the second individual based at least in part on the verified status of the first individual, wherein the priority value assigned to the message from the first individual has a higher priority than a priority value assigned to a message from another individual not having a verified status; and
   supplying the message and the assigned priority value to a client device associated with the second individual, wherein the client device is configured to display the message from the first individual in a ranked priority order with one or more other messages based on the assigned priority value.

9. The computer-implemented method of claim 1, comprising applying a communication restriction to the network communication between the first individual and the second individual that requires the first individual to initiate the network communication, wherein the communication restriction is applied based on the gender of the first individual.

10. The computer-implemented method of claim 9, wherein selection of a designated emoticon by the first individual using a client device overrides the communication restriction.

11. A system, comprising:
    one or more processors; and
    a computer-readable storage medium storing instructions which, when executed by the one or more processors, cause the one or more processors to perform operations comprising:
       receiving user information and matching criteria associated with a first individual, the matching criteria specifying one or more characteristics of one or more individuals from a pool of individuals;
       verifying the user information associated with the first individual to selectively establish a verified status for the first individual;
       generating a match between the first individual and a second individual from the pool of individuals based at least in part on the matching criteria and the verified status for the first individual; and
       enabling network communication between the first individual and the second individual in response to the match.

12. The system of claim 11, wherein the user information associated with the first individual comprises one or more of name, age, city, an image, biographical text, or a link to a social media profile.

13. The system of claim 11, wherein verifying the user information associated with the first individual comprises determining that a minimum number of parameters for the user information have been completed.

14. The system of claim 11, wherein verifying the user information associated with the first individual comprises verifying one or more parameters of the user information through a social network or a computer network identity resource.

15. The system of claim 11, wherein the matching criteria associated with the first individual comprises one or more facial features specified by the first individual, and wherein generating the match comprises:
   applying a facial recognition module to images of the one or more individuals from the pool of individuals to identify facial features of each of the one or more individuals; and
   filtering the one or more individuals based on the identified facial features and the one or more facial features specified by the first individual.

16. A non-transitory computer-readable storage medium storing instructions which, when executed by one or more processors, cause the one or more processors to perform operations comprising:
   receiving user information and matching criteria associated with a first individual, the matching criteria specifying one or more characteristics of one or more individuals from a pool of individuals;
   verifying the user information associated with the first individual to selectively establish a verified status for the first individual;
   generating a match between the first individual and a second individual from the pool of individuals based at least in part on the matching criteria and the verified status for the first individual; and
   enabling network communication between the first individual and the second individual in response to the match.

17. The non-transitory computer-readable medium of claim 16, wherein the user information associated with the first individual comprises one or more of name, age, city, an image, biographical text, or a link to a social media profile.

18. The non-transitory computer-readable medium of claim 16, wherein verifying the user information associated with the first individual comprises determining that a minimum number of parameters for the user information have been completed.

19. The non-transitory computer-readable medium of claim 16, wherein verifying the user information associated with the first individual comprises verifying one or more parameters of the user information through a social network or a computer network identity resource.

20. The non-transitory computer-readable medium of claim 16, wherein the matching criteria associated with the first individual comprises one or more facial features specified by the first individual, and wherein generating the match comprises:
   applying a facial recognition module to images of the one or more individuals from the pool of individuals to identify facial features of each of the one or more individuals; and
   filtering the one or more individuals based on the identified facial features and the one or more facial features specified by the first individual.

* * * * *